United States Patent [19]

Kawamoto

[11] 4,325,557
[45] Apr. 20, 1982

[54] APPARATUS FOR PREVENTING OIL LEAKAGE FROM A VEHICLE POWER TRANSMISSION

[75] Inventor: Tamio Kawamoto, Sagamihara, Japan

[73] Assignee: Nissan Motor Co., Ltd., Yokohama, Japan

[21] Appl. No.: 116,637

[22] Filed: Jan. 29, 1980

[30] Foreign Application Priority Data

Jan. 30, 1979 [JP] Japan .................................. 54-9863

[51] Int. Cl.³ .............................................. F16J 15/18
[52] U.S. Cl. ..................................... 277/65; 277/134; 277/153
[58] Field of Search ............... 277/134, 181, 182, 183, 277/DIG. 4, 65, 152, 153

[56] References Cited

U.S. PATENT DOCUMENTS

| 1,917,988 | 11/1933 | Large | 277/182 |
| 2,983,125 | 5/1961 | Peickii et al. | 277/65 |
| 3,075,690 | 1/1963 | Luenberger . | |
| 3,563,559 | 2/1971 | Scott | 277/65 |
| 3,801,111 | 4/1974 | Messenger | 277/65 |

FOREIGN PATENT DOCUMENTS

| 2639043 | 8/1977 | Fed. Rep. of Germany . |
| 1091397 | 11/1967 | United Kingdom . |
| 1097310 | 1/1968 | United Kingdom . |
| 1110219 | 4/1968 | United Kingdom . |
| 1541264 | 2/1979 | United Kingdom . |

Primary Examiner—Robert I. Smith
Attorney, Agent, or Firm—Thompson, Birch, Gauthier & Samuels

[57] ABSTRACT

A vehicle power transmission includes an extension casing into which projects a sleeve yoke which is rotatably journaled by the extension casing and connected to an output shaft of the transmission. Oil leakage between the extension casing and the sleeve yoke is minimized by an integral unit which comprises a cylindrical dust cover containing a baffle plate and an oil seal. The baffle plate is located between the oil seal and a bearing bush of the sleeve yoke. The integral unit facilitates mounting of the baffle plate and maintains the desired location thereof with respect to the associated elements.

3 Claims, 3 Drawing Figures

APPARATUS FOR PREVENTING OIL LEAKAGE FROM A VEHICLE POWER TRANSMISSION

The present invention relates to an apparatus for preventing oil leakage out of a vehicle power transmission.

Conventionally, a vehicle power transmission includes an extension casing, an output shaft extending within the extension casing, and a sleeve yoke connected with the output shaft. The sleeve yoke projects into the extension casing an is rotatably supported by the latter. Since the extension casing is normally inclined downwardly and rearwardly, a substantial amount of lubrication oil leaks from the rear end of the extension casing, even though an oil seal is arranged at the rear end. This results in an increase in oil consumption and environmental contamination of the surroundings.

Although such an undesirable oil leakage originates to some extent from improper and unsatisfactory performance, quality and mounting of the oil seal and the sleeve yoke, it is known that the main reason for the leakage lies in the fact that the inclined end portion of the extension casing has to be normally filled with lubrication oil; otherwise, undesirable seizure takes place between the extension casing and the sleeve yoke journalled thereby, owing to insufficient lubricating effect.

In order to limit the amount of oil such that bearing bush between the extension casing and the sleeve yoke is supplied with sufficient amount of oil but the oil seal is not applied by excessive amount of oil, a baffle plate is conventionally disposed between the bearing bush and the oil seal. The baffle plate has on its inner peripheral surface a plurality of inclined oil grooves so that relative rotation between the baffle plate and the sleeve yoke returns oil toward the bearing bush.

Because of the limited space within the rear end portion of the extension casing accommodating the baffle plate, besides the fact that required amount of oil should be supplied to the oil seal, the baffle plate has generally a ring-shaped configuration having a relatively small thickness, and is spaced from the oil seal so that they do not interfere with each other. The baffle plate has to be inserted into the extension casing coaxially of the sleeve yoke, and at right angle with respect to the axis of the yoke. Thus, accurate mounting of the baffle plate in a facilitated manner can not be expected. Moreover, as the baffle plate is inclined from its desired upright position due to vibration of the vehicle body or for other reasons, the baffle plate may interfere with the sleeve yoke or with the oil seal. Thus, desired performance of the baffle plate may be deteriorated.

An object of the present invention is to provide an improved apparatus for preventing oil leakage from a vehicle transmission, which mitigates the above-mentioned drawbacks of the conventional arrangement.

According to the present invention, there is provided an apparatus for preventing oil leakage from a vehicle power transmission of the type wherein one end of a sleeve yoke protrudes into a casing where it is rotatably supported by an oil lubricated bearing and connected to an axially aligned output shaft extending through the casing. The apparatus includes a non-rotatable dust cover surrounding the sleeve yoke end, with a cylindrical protrusion received in the casing. A flexible oil seal is arranged within the cylindrical protrusion to surround and sealingly engage the sleeve yoke end on the side of the bearing. A baffle plate has a ring-shaped portion arranged within the dust cover's cylindrical protrusion at a location surrounding the sleeve yoke end between the oil seal and the bearing. The dust cover, oil seal and baffle plates are fixedly interconnected for attachment to the casing as an integral unit.

The present invention will now be explained in detail by referring to a preferred embodiment shown in the drawings, in which.

Figure 1:
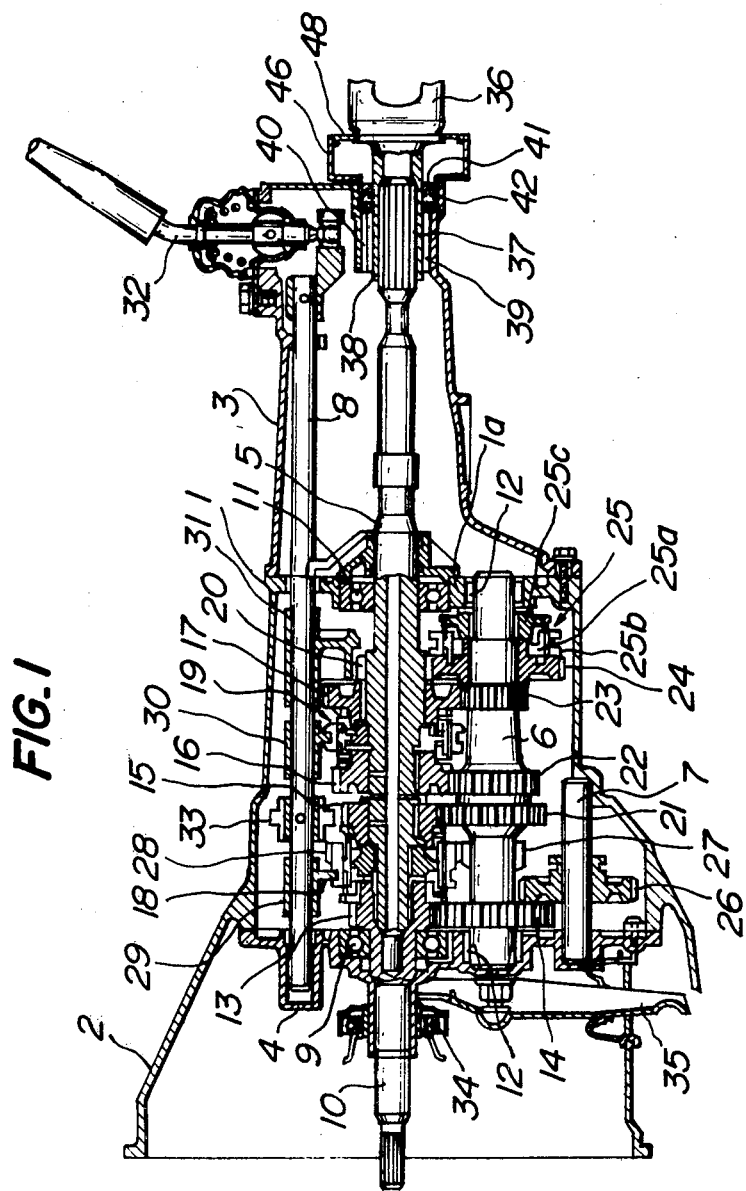
FIG. 1 is a longitudinal-sectional view of a vehicle power transmission to which the present invention may conveniently be applied.

Referring firstly to FIG. 1, reference numeral 1 designates a transmission casing formed integrally with a clutch housing 2, 3 an extension casing formed separately of the transmission casing 1 and secured by screws on the rear end thereof, and 4 a front cover mounted on the front surface of the transmission casing 1. The transmission casing 1, the extension casing 3 and the front cover 4 jointly form a gear housing. In the gear housing, a main shaft 5, a counter shaft 6, an idle shaft 7 and a fork rod or a control shaft 8 are supported in parallel relationship.

The front end of the main shaft 5 is freely rotatably relative to and is axially received in a hollow rear end of a main drive shaft 10 which in turn is supported through a bearing 9 by the front cover 4. The main shaft 5 is supported at the middle portion thereof by a rear end wall of the transmission casing 1 by means of a bearing 11, and the rear end of the main shaft 5 is arranged to extend to a rear end position of the extension casing 3. The counter shaft 6 is supported at its front and rear ends by the front cover 4 and the rear end wall 1a of the transmission casing 1, respectively, with bearings 12 and 12. The idle shaft 7 is fixed at its both ends by the front cover 4 and a part of the transmission casing 1. The fork rod 8 extends between the transmission casing 1 and the extension casing 3, and is permitted, within limited ranges, to rotate as well as to move axially.

The main drive shaft 10 is rotatably driven by the engine via a clutch, not shown. Torque is transmitted to the counter shaft 6 through a main drive gear 13 provided at the rear end of the main drive shaft 10 and a counter gear 14 meshing therewith. On the main shaft 5 are rotatably mounted a third speed gear 15, a second speed gear 16 and a first speed gear 17 in this sequence from the front end of the shaft (viewed from left to right in FIG. 1). There are mounted on the main shaft 5, synchronizers 18 and 19 between the main drive gear 13 and the third speed gear 15, and between the second speed gear 16 and the first speed gear 17, respectively. Furthermore, there is provided an overdrive gear 20 located adjacent to the rear side of the first speed gear 17.

The counter shaft 6 comprises a third gear 21, a second gear 22 and a first gear 23 which are formed integrally with the shaft 6 and which are located to be meshed with the respective speed gears 15, 16 and 17. At rear end side of the first gear 23, there are provided a rotatably mounted overdrive gear 24 meshing with said overdrive gear 20, and a synchronizer 25 located adjacent thereto. This synchronizer 25 has a synchrohub 25a spline-coupled with the overdrive gear 24 so as to allow rotation of a coupling sleeve 25b relative to the shaft 6, and a clutch 25c spline-coupled with the shaft 6 to rotate with said shaft.

On the idle shaft 7, a reverse idle gear 26 is axially movably mounted. When the reverse idle gear 26 is moved rightwardly from the position indicated in FIG. 1, it meshes with a reverse gear 27 formed integrally with the counter shaft 6, and with a reverse gear 28 formed on the periphery of the coupling sleeve 18a of the synchronizer 18.

The fork rod 8 carries forks 29, 30 and 31 at their respective boss portion, each corresponding to the synchronizers 18, 19 and 25, respectively. The free ends of these forks 29, 30 and 31 are arranged angularly spaced from each other about the axis of the fork rod 8. When the fork rod 8 is rotated about its axis by the control lever 32, a shift interlock mechanism 33, formed integrally with the fork rod 8, selects one of the forks, and the thus selected fork is moved axially as the axial movement of the fork rod 8 takes place. An end of a lever 49 pivotally mounted on the casing is arranged to abut with the aforementioned reverse idle gear 26. Another end of the lever 49 is arranged to extend in parallel with the fork rods. At the time of selecting the reverse running condition, this lever is swung by the shift interlock mechanism to move the reverse idle gear 26 axially.

In FIG. 1, reference number 34 designates a reverse bearing, and 35 a withdrawal lever, both provided to disengage the clutch.

Figure 2:
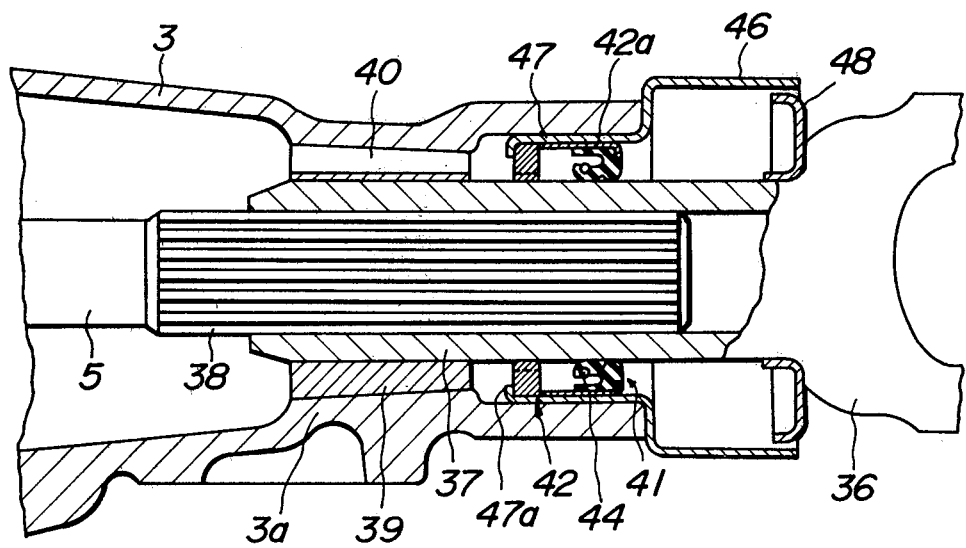
FIG. 2 is an enlarged sectional view showing the apparatus according to one embodiment of the present invention.

As shown in FIG. 2, at the rear portion of the extension casing 3, the rear end of the main shaft 5 is spline-coupled with cylindrical front end 37 of a sleeve yoke 36 which is journaled, through a bearing bush 39, by means of inwardly projecting portion 3a formed on the inner surface of the extension casing 3. The bush 39 on its outer peripheral surface is formed with a plurality of axially extending oil grooves 40. On the rear end side of the bush 39, the extension casing 3 is provided with an oil seal 41 secured to the inner surface of cylindrical portion 42a of a baffle plate 42 which, in turn, is secured to the inner surface of a dust cover 46.

Figure 3:
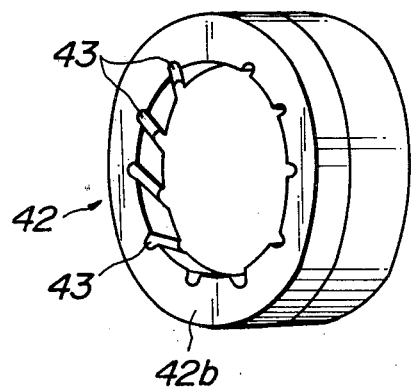
FIG. 3 is a perspective view showing one example of the baffle plate.

As shown in FIG. 3, the baffle plate 42 comprises a ring-shaped portion 42b formed integrally with the cylindrical portion 42a and having a smaller inner diameter. The ring-shaped portion is formed on its inner peripheral surface with a plurality of grooves 43 each having an axis which is inclined with respect to the axis of the main shaft 5 by a predetermined angle but which does not intersect with the latter axis. The oil seal 41 consists of a so-called double lip seal having a substantially U-shaped cross-section and formed of resilient material. The liquid tightness between the oil seal 41 and the sleeve yoke 37 can be improved by means of a spring ring 44 engaging with the inner lip of the seal. Such an oil seal, per se, is known.

The oil seal 41 is secured to the inner surface of the cylindrical portion 42a of the baffle plate 42 with predetermined distance between the seal 41 and the ring-shaped portion 42b. This integral unit is secured to the inner surface of the small diameter portion 47 of the dust cover 46. The cover 46, in turn, is press-fitted at the small diameter portion 47 within the rear end of the extension casing 3. The sleeve yoke 37 is provided with a flange 48 which cooperates with the dust cover 46 to prevent entry of foreign matters, such as dust, into the extension casing.

With the above arrangement, the baffle plate 42 and the oil seal 41 are integrally secured to the dust cover 46 to form a sub-assembly. Thus, only by press-fitting the dust cover 46 into the extension casing, the baffle plate 42 and the oil seal 41 can be automatically mounted and located in position.

Preferably, the baffle plate 42 is secured to the dust cover 46 by means of press-fitting or adhesive agent.

Conveniently, the front end of the small diameter portion 47 of the dust cover 46 is formed as an inwardly projecting flange 47a such that the front end surface of the baffle plate 42 is supported by the flange 47a to thereby maintain the desired orientation of the baffle plate.

Since the baffle plate 42 is secured on its outer peripheral surface to the dust cover 46, centering of the baffle plate 42 is automatically achieved at the time of mounting, and the desired upright position is positively maintained. By this, the oil having passed through the inclined grooves 43 as far as the rear end thereof facing to the oil seal 41 is returned back to the front end thereof by means of a pumping function obtained by the relative rotation between the grooves 43 and the outer peripheral surface of the sleeve yoke 37. Thus, the space between the oil seal 41 and the baffle plate 42 is not filled with excessive amount of oil, what is the desired function of the baffle plate 42 to be maintained.

In the embodiment thus far described, the oil seal 41 is secured to one end of the baffle plate 42. But, they may be separately secured to the dust cover.

As is apparent from the foregoing description, according to the present invention, the baffle plate and the oil seal are formed as an integral unit which can be mounted in a facilitated manner, without individual mounting steps. Moreover, since the baffle plate is properly supported in the centered position with respect to the extension casing, the desired function of the baffle plate can be maintained.

What is claimed is:

1. In a vehicle power transmission having one end of a sleeve yoke protruding into a casing, said sleeve yoke end being rotatably supported by an oil-lubricated bearing contained by said casing and being connected to an axially aligned output shaft extending through said casing, apparatus for preventing oil leakage between said casing and said sleeve yoke end comprising:

a non-rotatable dust cover surrounding said sleeve yoke end, said dust cover having a cylindrical protrusion received in said casing, a flexible oil seal arranged within said cylindrical protrusion to surround and sealingly engage said sleeve yoke end on the outer side of said bearing, a baffle plate having a ring-shaped portion arranged within said cylindrical protrusion to surround said sleeve yoke end between and in an axially opposed position relative to both said oil seal and said bearing, said dust cover, oil seal and baffle plate being fixedly interconnected for attachment to said casing as an integral unit.

2. The apparatus as claimed in claim 1, wherein said ring-shaped portion has an inner diameter corresponding to the outer diameter of said sleeve yoke end, and wherein said baffle plate is further provided with a cylindrical portion extending axially outwardly from the outer periphery of said ring-shaped portion, said oil seal being secured to said cylindrical portion in axially spaced relationship with respect to said ring-shaped portion to form an integral sub-assembly.

3. The apparatus as claimed in claim 2, wherein the cylindrical protrusion of the dust cover terminates in an inwardly projecting flange abutting with an end of said sub-assembly.

* * * * *